United States Patent
Hu et al.

(10) Patent No.: US 8,948,769 B2
(45) Date of Patent: *Feb. 3, 2015

(54) METHOD AND ARRANGEMENT FOR ADAPTING POWER OF REFERENCE SIGNALS

(71) Applicant: Telefonaktiebolaget L M Ericsson (publ), Stockholm (SE)

(72) Inventors: Yang Hu, Beijing (CN); David Astely, Bromma (SE); George Jongren, Stockholm (SE); Jianfeng Wang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/053,901

(22) Filed: Oct. 15, 2013

(65) Prior Publication Data

US 2014/0036846 A1 Feb. 6, 2014

Related U.S. Application Data (63) Continuation of application No. 12/955,191, filed on Nov. 29, 2010, now Pat. No. 8,649,793, which is a continuation-in-part of application No. PCT/CN2010/000214, filed on Feb. 17, 2010.

(51) Int. Cl.
*H04W 72/00* (2009.01)
*H04B 7/04* (2006.01)
(Continued)

(52) U.S. Cl.
CPC ........... *H04B 7/0426* (2013.01); *H04W 52/325* (2013.01); *H04W 52/42* (2013.01); *H04L 5/0023* (2013.01); *H04L 5/0048* (2013.01)
USPC ............... 455/450; 455/522; 455/69; 455/70; 455/451; 455/452.1; 370/315; 370/316; 370/317; 370/318; 370/319

(58) Field of Classification Search
USPC .............................. 455/522, 69–70, 450–455; 370/315–320
See application file for complete search history.

(56) References Cited

U.S. PATENT DOCUMENTS

| 2009/0041151 A1 | 2/2009 | Khan et al. | |
| 2012/0238310 A1* | 9/2012 | Xiao et al. | 455/522 |
| 2012/0314667 A1* | 12/2012 | Taoka et al. | 370/329 |

FOREIGN PATENT DOCUMENTS

| CN | 101394208 A | 3/2009 |
| CN | 101621492 A | 1/2010 |

(Continued)

OTHER PUBLICATIONS

International Search Report and Written Opinion of the International Searching Authority, PCT/CN2010/001909, Mar. 10, 2011.

(Continued)

*Primary Examiner* — Fayyaz Alam
(74) *Attorney, Agent, or Firm* — Myers Bigel Sibley & Sajovec, P.A.

(57) ABSTRACT

A method and an arrangement in a radio network node for adapting transmission power of resource elements for demodulation reference signals, referred to as "reference elements" are provided. The radio network node is configured for multiple-input multiple-output transmission, referred to as "MIMO transmission", to a user equipment. The MIMO transmission comprises at least three layers. Two consecutive subcarriers of a resource block carry at least three reference elements. A first subcarrier of the resource block carries data elements. The radio network node adapts transmission power of said at least three reference elements such that an average transmission power, over said two consecutive subcarriers, of said at least three reference elements is equal to a transmission power, for the first subcarrier, of the data elements for said at least three layers. The radio network node uses the adapted transmission power to transmit, to the user equipment, said at least three reference elements.

10 Claims, 5 Drawing Sheets

(51) Int. Cl.
*H04W 52/32* (2009.01)
*H04W 52/42* (2009.01)
*H04L 5/00* (2006.01)

(56) References Cited

FOREIGN PATENT DOCUMENTS

| CN | 101641894 A | 2/2010 |
|---|---|---|
| WO | WO 2009/002078 A2 | 12/2008 |
| WO | WO 2009/002078 A3 | 12/2008 |

OTHER PUBLICATIONS

International Search Report and Written Opinion of the International Searching Authority, PCT/CN2010/000214, Nov. 25, 2010.
3GPP™, "3rd Generation Partnership Project; Technical Specification Group Radio Access Network; Further Advancements for E-UTRA Physical Layer Aspects"; Release 9; 3GPP TR 36.814 V1.5.0; (Nov. 2009), 53 pp.
3GPP TSG RAN WG1 Meeting #58bis, RAN1 Chairman's Notes, Miyazaki, Japan, Oct. 12-16, 2009, 33 Pages.
3GPP TSG RAN WG1 Meeting #59, Jeju, Korea, Nov. 9-13, 2009, 34 Pages.
Extended European Search Report, for EP 10 84 5985, dated Jan. 7, 2014, 6 pages.
ZTE: "Power Offset Issue on DMRS Mapping," 3GPP TSG-RAN WG1 #60, Draft; R1-101403, Mobile Competence Center; 650, Route Des Lucioles; F-06921 Sophia-Antipolis Cedex, France; vol. RAN WG1, No. San Francisco 20100222, Feb. 16, 2010 [retrieved Feb. 16, 2010], 4 pages.
NEC Group: "Downlink Control Signalling for Transparent MU-MIMO," 3GPP TSG-RAN WG1 Meeting #59bis, Draft, R1-100306, Mobile Competence Centre; 650 , Route Des Lucioles; F-06921 Sophia-Antipolis Cedex; France, vol. RAN WG1, No. Valencia, Spain; 20100118, Jan. 12, 2010 [retrieved on Jan. 12, 2010], 3 pages.
Chinese First Office Action Corresponding to Chinese Patent Application No. 201080064196.0; Date of Issue: Jun. 19, 2014; Foreign Text, 7 Pages, English Translation Thereof, 10 Pages.

* cited by examiner

Fig. 1

Fig. 2A
Rel-10 Rank-1

Fig. 2B
Rel-10 Rank-2

Fig. 2C
Rel-10 Rank-3

Fig. 2D
Rel-10 Rank-4

Fig. 5A
*Rel-10 Rank-3*

Fig. 5B
*Rel-10 Rank-4*

Fig. 5C
*Rel-10 Rank-3*

Fig. 5D
*Rel-10 Rank-4*

Fig. 6

METHOD AND ARRANGEMENT FOR ADAPTING POWER OF REFERENCE SIGNALS

CROSS REFERENCE TO RELATED APPLICATION

The present application is a continuation of U.S. application Ser. No. 12/955,191, which was filed Nov. 29, 2010 and which is a continuation-in-part application and claims priority to PCT International Application No. PCT/CN2010/000214, filed on 17 Feb. 2010, the disclosures and content of which are incorporated by reference herein in their entirety.

TECHNICAL FIELD

The present disclosure relates to the field of telecommunication. More specifically, the present disclosure relates to a method and an arrangement in a radio network node for adapting power of resource elements for demodulation reference signals.

BACKGROUND

The 3rd Generation Partnership Project (3GPP) is responsible for the standardization of Universal Mobile Telecommunication Service (UMTS) system and Long Term Evolution (LTE). LTE is a technology for realizing high-speed packet-based communication that may reach high data rates both in the downlink and in the uplink, which is thought as a next generation mobile communication system of the UMTS system. The 3GPP work on LTE is also referred to as Evolved Universal Terrestrial Access Network (E-UTRAN). An LTE system can provide peak rates of 300 Mbps, a radio-network delay of e.g. 5 ms or less, a significant increase in spectrum efficiency and a network architecture designed to simplify network operation, reduce cost, etc. In order to support high data rates, LTE allows for a system bandwidth of up to 20 MHz. LTE is also able to operate in different frequency bands and can operate in at least Frequency Division Duplex (FDD) and Time Division Duplex (TDD). The modulation technique or the transmission scheme used in LTE is known as Orthogonal Frequency Division Multiplexing (OFDM).

For the next generation mobile communications system e.g. International Mobile Telecommunications Advanced (IMT-Advanced) and/or LTE-Advanced, which is an evolution of LTE, support for bandwidths of up to 100 MHz has been discussed. LTE-Advanced may be viewed as a future release of the LTE standard and since it is an evolution of LTE, backward compatibility is important so that LTE-Advanced can be deployed in spectrum already occupied by LTE. In both LTE and LTE-Advanced radio base stations, known as eNBs or eNodeBs—where 'e' stands for evolved-, multiple antennas with precoding/beamforming technology may be adopted in order to provide high data rates to user equipments. Thus, LTE and LTE-Advanced are examples of Multiple-Input, Multiple-Output (MIMO) radio systems. Another example of a MIMO radio system is a Worldwide Interoperability for Microwave Access (WiMAX) system.

In a known LTE system, such as LTE release 8 or 9 (Rel 8 or 9), so called user equipment specific reference signals, RS, has been specified for single layer beamforming. Single layer beamforming implies a transmission of rank 1, also referred to as rank 1 transmission. As an example, reference signals are provided for the purpose of channel quality measurements in order to enable channel demodulation. Two layer beamforming may also be employed. Two layer beamforming may be referred to as transmission of rank 2, or rank 2 transmission.

In case of transmission of rank 1 or 2 for the above mentioned, known LTE system, it has been decided to use same, or equal, transmit power for reference signal resource element (RS RE) and data resource element (data RE). Thus, the same transmit power for RS RE and data resource element (data RE) is handled and assumed by a user equipment (UE) when the user equipment receives transmissions. Hence, the UE may apply the same power processing to demodulation reference signal resource elements (DM-RS RE) and data RE for each layer. Since the same power processing is used for all layers, there is no need for control signaling on power normalization to indicate to UEs which power level has been used.

In LTE-Advanced, it has been proposed that up to rank 8 transmission, or transmission of rank 8, is to be supported by using an advanced antenna configuration, e.g. 8×8 high-order MIMO. Moreover, up to 8 user equipment specific reference signals, referred to as demodulation RS or DM-RS, have been introduced for the purpose of channel demodulation.

Figure 1:
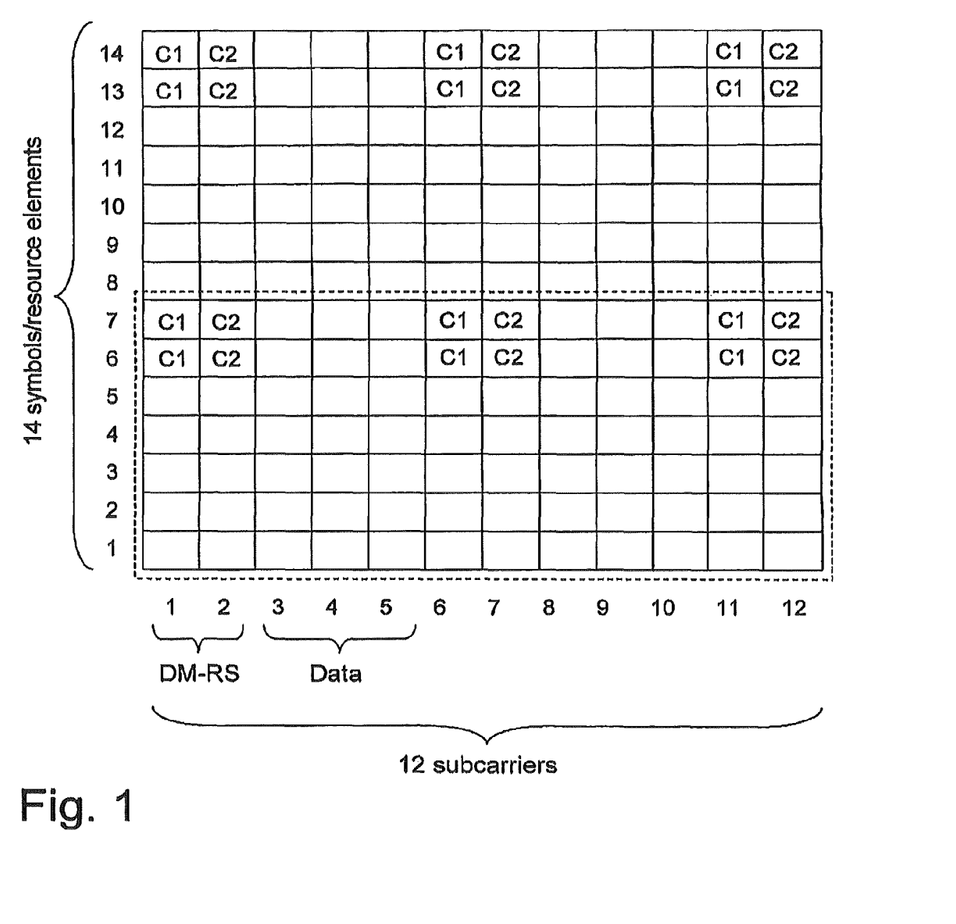
FIG. 1 is a resource element structure used in OFDM transmissions.

FIG. 1 is a resource element structure, depicting two resource blocks, used in OFDM transmissions of an LTE-Advanced system. A first resource block is indicated by the rectangle drawn with a dashed line. A vertical axis indicates time/symbols in time domain and a horizontal axis indicates frequency, e.g. subcarriers. DM-RS resource elements are indicated by C1 and C2 as is explained below. Empty boxes in FIG. 1 may, for example, comprise symbols for data, control or other items. With reference to FIG. 1, some characteristics of DM-RS according to LTE-Advanced with normal cyclic prefix (CP) are given below:

- The same RS position, i.e. in time domain last two symbols in each resource block and in frequency domain subcarrier number 1, 2, 6, 7, 11 and 12.
- RS overhead of 12 RE per layer, see 12 indications of C1 and C2, respectively.
- Up to two CDM groups (Code Division Multiplexing), frequency division multiplexing (FDM) as shown by C1 and C2.
- For rank 3-8 transmission, two CDM groups, indicated by C1 and C2, are used, and for rank 1-2 only one CDM group (group 1 indicated by C1) is used.
- Orthogonal cover codes (OCC) across time domain only Hence, for high-order MIMO according to LTE-Advanced, up to 8 DM-RS will be transmitted in conjunction with up to rank 8 transmission. As shown in FIG. 1, two CDM groups C1, C2 will be applied when transmission layers go beyond two, i.e. for rank 3-8, transmission layers will be distributed into the two CDM groups C1, C2. Rank 1-2 transmission of LTE-Advanced can re-use Rank 1-2 transmission of the above mentioned, known LTE system. Thus, power utilization scheme for LTE-Advanced for Rank 1-2 does not differ from power utilization scheme for the above mentioned, known LTE system for Rank 1-2. Therefore, for reasons of consistency, a suggestion to expand the power utilization scheme to cover LTE-Advanced Rank 3-8 as well may have been presented. In such situation, DM-RS RE will require different power processing as compared to data RE. However, the UE assumes the same transmit power as mentioned above. Therefore, this may, for example, lead to inaccuracies in channel estimation and low power efficiency.

SUMMARY

An object is how to provide a power utilization scheme for reference elements in the downlink, which power utilization scheme improves performance in a telecommunication system.

According to an aspect, the object may be achieved by a method in a radio network node for adapting transmission power of resource elements for demodulation reference signals, referred to as "reference elements". The radio network node is configured for multiple-input multiple-output transmission, referred to as "MIMO transmission", to a user equipment. The MIMO transmission comprises at least three layers, each layer being allocated to a resource block of said MIMO transmission. The resource block comprises subcarriers. Two consecutive subcarriers of the resource block carry at least three reference elements for said at least three layers. A first subcarrier of the resource block carries data elements for said at least three layers. The first subcarrier is different from said two consecutive subcarriers. The radio network node adapts transmission power of said at least three reference elements such that an average transmission power, over said two consecutive subcarriers, of said at least three reference elements is equal to a transmission power, for the first subcarrier, of the data elements for said at least three layers. Moreover, the radio network node uses the adapted transmission power to transmit, to the user equipment, said at least three reference elements.

According to another aspect, the object may be achieved by an arrangement in a radio network node for adapting transmission power of resource elements for demodulation reference signals, referred to as "reference elements". The radio network node is configured for multiple-input multiple-output transmission, referred to as "MIMO transmission", to a user equipment. The MIMO transmission comprises at least three layers, each layer being allocated to a resource block of said MIMO transmission. The resource block comprises subcarriers. Two consecutive subcarriers of the resource block carry at least three reference elements for said at least three layers. A first subcarrier of the resource block carries data elements for said at least three layers. The first subcarrier is different from said two consecutive subcarriers. The arrangement comprises a processing circuit configured to adapt transmission power of said at least three reference elements such that an average transmission power, over said two consecutive subcarriers, of said at least three reference elements is equal to a transmission power, for the first subcarrier, of the data elements for said at least three layers. Moreover, the processing circuit is configured to use the adapted transmission power to transmit, to the user equipment, said at least three reference elements.

Thus, in embodiments disclosed herein, the radio network node adapts transmission power of said at least three reference elements such that an average transmission power, over said two consecutive subcarriers, of said at least three reference elements is equal to a transmission power, for the first subcarrier, of the data elements for said at least three layers. In this manner, gaps (i.e. any existing gaps) between transmission power of reference elements and data elements are averaged out. A gap may be represented by a difference in transmit power between transmit power of one of said two consecutive subcarriers and the transmit power of the first subcarrier. Thanks to the adaptation of the transmission power as specified above, a more efficient power utilization scheme is provided. Said more efficient power utilization scheme exploits the gaps, i.e. adapts the transmission power of the reference elements such as to at least partly fill the gaps. As a result, the above mentioned object is obtained.

Further features of, and advantages with, embodiments and aspects will become apparent when studying the appended claims and the following description. It is to be understood that different features disclosed herein may be combined to create embodiments other than those described in the following.

BRIEF DESCRIPTION OF THE DRAWINGS

Embodiments and aspects will become more fully understood from the detailed description below and the accompanying drawings, which are given by way of illustration only, and are thus not intended to limit the scope of the present disclosure.

DETAILED DESCRIPTION

This disclosure relates generally to demodulation performance improvement for LTE-Advanced, where high-order MIMO is applied to support up to rank 8 transmission. The detailed description below is based on an exemplifying Evolved Universal Terrestrial Radio Access (E-UTRA) system (which is also commonly referred to as the Long-Term Evolution (LTE) of the widely deployed WCDMA systems).

With reference to the background section, some observations regarding the suggestion to expand the power utilization scheme to cover LTE-Advanced Rank 3-8 will be described in conjunction with FIG. 2A-2D in order to facilitate appreciation of embodiments disclosed herein. The suggestion is, as mentioned in the background section, to allocate the same power for reference elements, such as DM-RS RE, and data resource elements for each layer.

Figure 2A:
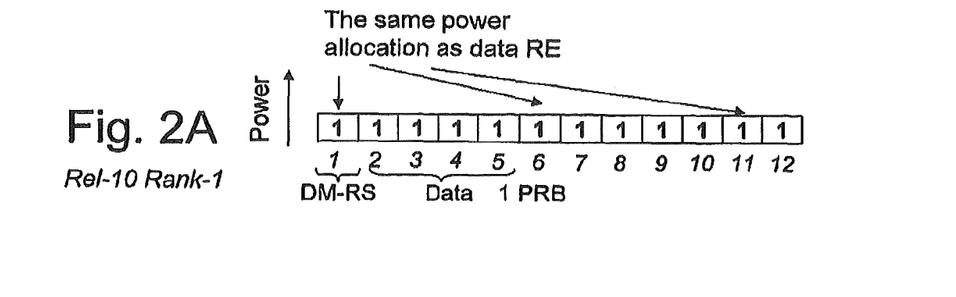
FIG. 2A-2D show power diagrams for MIMO transmissions for Rank 1 to 4 according to prior art.
Figure 2B:
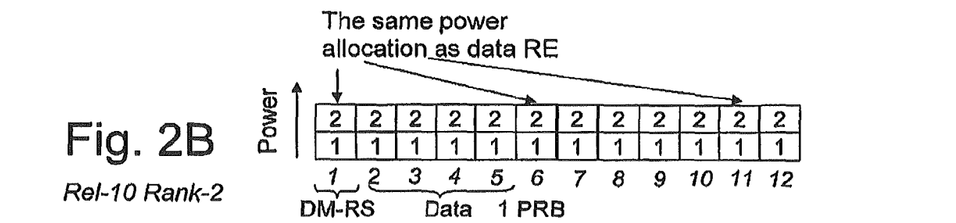
Figure 2C:
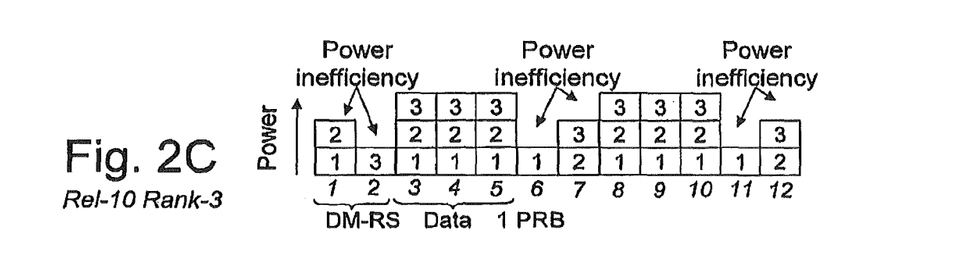
Figure 2D:
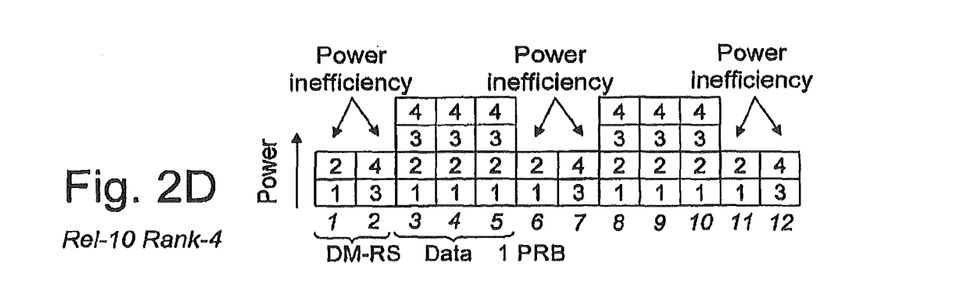

With reference to FIG. 2A-2D, there is shown power utilization for LTE-Advanced rank 1-4 cases according to the suggestion of using the same power for reference elements and data resource elements. Rank 5-8 cases may be similarly extended. In the Figures, 12 subcarriers of a Physical Resource Block (PRB) are shown along the horizontal axis. Power of resource elements is indicated along the vertical axis. The reference numerals 1, 2, 3 and 4 enclosed by boxes shown in the Figures denote a number referring to a layer. E.g. '1' refers to layer 1, '2' refers to layer 2 and so on. Rank 1-2 cases are provided for comparison purpose only as shown in FIG. 2A-2B. It may be observed that for LTE-Advanced rank 1-2, reference elements, such as DM-RS RE, has the same power allocation as data RE. For rank 1-2 only one CDM group, see subcarrier 1, 6 and 11, is applied. However, for LTE-Advanced rank 3, unequal (or uneven) layer allocation is made in two CDM groups, see subcarrier 1, 2, 6, 7, 11 and 12 of FIG. 2C. The layer allocation is unequal in that total transmit power of reference elements, allocated to each of the CDM groups, is different as compared to transmit power of data elements. Furthermore, it has been observed that power utilization on reference elements, such as DM-RS RE, is not always efficient for rank 3 and higher. Hence, power utilization is not efficiently distributed among subcarriers for LTE- Advanced rank 3, Rank 5 and 7 may be similarly extended. As a further example, for rank 4 different power processing is needed for reference elements and data elements, as shown in FIG. 2D. A disadvantage of the suggestion illustrated by FIG. 2C-2D may be that power utilization for DM-RS RE in case of rank 3 or higher is not efficient. In addition, if the difference in power between reference elements and data elements is not taken into account channel estimation accuracy may be influenced.

In order to improve power utilization for DM-RS RE, embodiments herein use DM-RS power boosting. However, in some embodiments, control signaling overhead seems to be needed in order to indicate UE terminals to do power normalization for M-QAM demodulation (Multi-Level Quadrature Amplitude Modulation).

Throughout the following description similar reference numerals have been used to denote similar elements, parts, items or features, when applicable.

Figure 3:
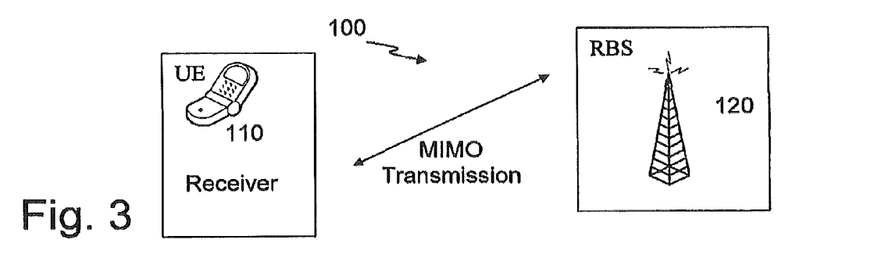
FIG. 3 is a block diagram of a radio base station communicating with a user equipment using MIMO transmissions.

FIG. 3 is a block diagram of a radio network node 120 communicating with a user equipment 110 while using MIMO transmissions. A radio communication system 100 may comprise the user equipment 110 and the radio network node 120, such as a radio base station (RBS), an eNodeB (eNB) or the like. An arrow, denoted "MIMO Transmission", indicates that the radio network node 120 may be configured for multiple-input multiple-output transmission, referred to as "MIMO transmission", to the user equipment 110. The MIMO transmission comprises at least three layers. Each layer may be allocated to a resource block of the MIMO transmission. The resource block comprises subcarriers, wherein two consecutive subcarriers of the resource block carry at least three reference elements for said at least three layers, and wherein a first subcarrier of the resource block carries data elements for said at least three layers. The first subcarrier is different from said two consecutive subcarriers. In embodiments, the resource block comprises two subcarriers, such as said two consecutive subcarriers, that are intended to be use for transmission of reference elements.

Figure 4:
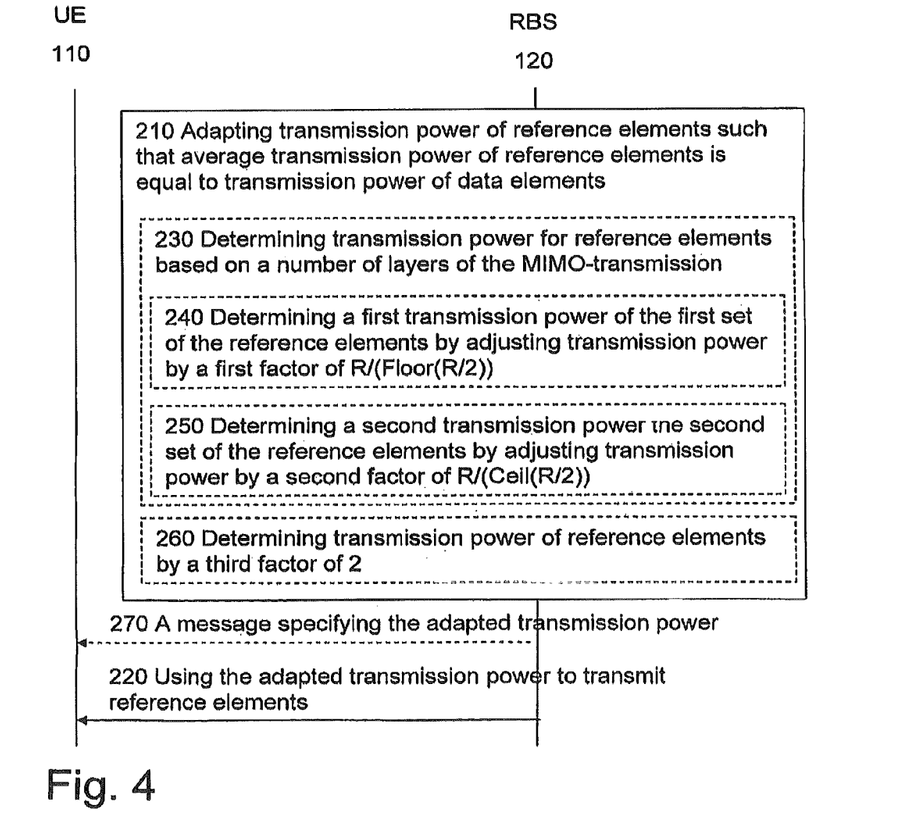
FIG. 4 shows a schematic, exemplifying, combined signaling and flow chart according to an embodiment of the method performed in the system of FIG. 3.

FIG. 4 shows an exemplifying, combined signaling and flow chart describing communication between the radio network node and the UE. In one embodiment of the method performed in the radio network node of FIG. 3, the following steps may be performed.

210 The radio network node 120 adapts transmission power of said at least three reference elements such that an average transmission power, over said two consecutive subcarriers, of said at least three reference elements is equal to a transmission power, for the first subcarrier, of the data elements for said at least three layers.

220 The radio network node 120 uses the adapted transmission power to transmit, to the user equipment 110, said at least three reference elements. In some embodiments, one or more of steps 230, 240, 250, 260 and 270 may be performed as described below.

In some embodiments of the method in the radio network node 120, the adapting of transmission power may be performed by:

230 The radio network node 120 determines transmission power of each reference element of said at least three reference elements based on a number of layers of the MIMO-transmission. The number of layers is at least three.

In some embodiments of the method in the radio network node 120, a first set of reference elements comprises a first at least one reference element of said at least three reference elements. Said first at least one reference element is allocated to a first subcarrier of said two consecutive subcarriers, and a second set of reference elements comprises a second at least one reference element of said at least three reference elements. Said second at least one reference element is allocated to a second subcarrier of said two consecutive subcarriers.

In some embodiments of the method in the radio network node 120, the first set of reference elements is comprised in a first code division multiplexing group, and the second set of reference elements is comprised in a second code division multiplexing group.

In some embodiments of the method in the radio network node 120, the determining 230 may be performed by the following step or steps.

240 The radio network node 120 determines a first transmission power of each reference element of the first set of the reference elements by adjusting transmission power by a first factor of $R/\text{floor}(R/2)$; and/or 250 The radio network node 120 determines a second transmission power of each reference element of the second set of the reference elements by adjusting transmission power by a second factor of $R/\text{ceil}(R/2)$, where R is a transmission rank of said MIMO transmission.

Figure 5A:
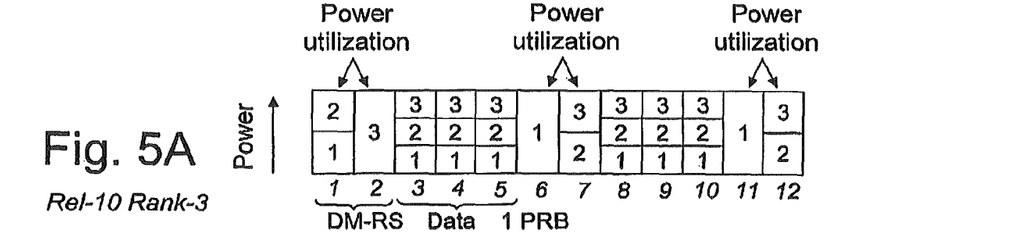
FIG. 5A-5D show power diagrams for MIMO transmissions for Rank 1 to 4 according to embodiments of the present disclosure.
Figure 5B:
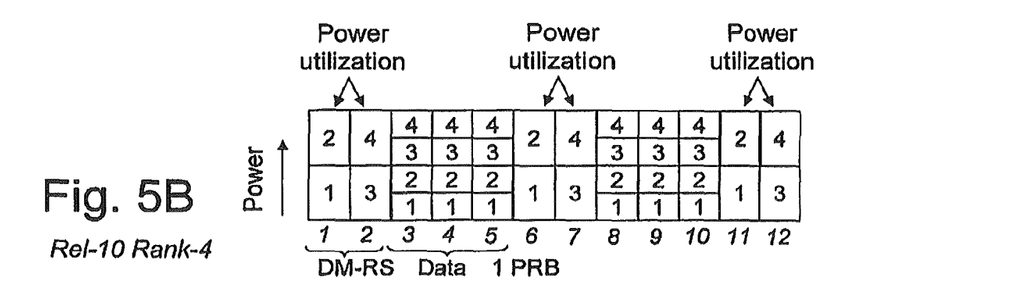

This is illustrated in FIG. 5A-5B, which show power diagrams for MIMO transmissions for Rank 3 and 4, respectively. Since boosted power, i.e. the increased power used for DM-RS RE, is associated with the rank value R, no additional control signaling, for indicating to UE terminals the values (or factors) X and Y, needs to be introduced in this embodiment.

Next, a description explaining how the steps 240 and 250 may be derived is provided.

Precoder design in LTE-Advanced may be analyzed by reviewing the following two cases:
  Case-1: constant modulus precoder, in which each layer is transmitted from all antennas with constant modulus weighting vector. In this manner, transmit power can be evenly divided by transmission layers.
  Case-2: non-constant modulus precoder, in which, each layer may be transmitted from some antennas or from all antennas with non-constant modulus weighting vector. In this manner, transmission layers of the MIMO transmission may have different transmit power.

As a first example, when constant modulus precoder is used, full transmit power utilization may be enabled for CDM group 1 and 2. A function (or formula), which may be used by the user equipment to determine the power used for the reference elements, such as DM-RS RE, has been worked out. In FIG. 5A-5B, the basic concept is illustrated for Rank-3 and Rank-4. In the Figure, it may be seen that the transmit power (or transmission power) is evenly divided among the transmission layers (or layers for short).

Continuing the first example, in case of rank-3, layer-1 (in CDM group-1) has boosted power by 3/1 times (or, expressed differently, increased by a factor of 3/1) on DM-RS RE while layer-2 or layer-3 (in CDM group-2) has boosted power by 3/2 times on DM-RS RE.

In addition, further as part of the first example, in case of rank-4, layer-1 or layer-2 (in CDM group-1) has boosted power by 4/2 times on DM-RS RE while layer-3 or layer-4 (in CDM group-2) has boosted power by 4/2 times on DM-RS RE.

The first example may be extended to rank 5-8 without detailed description presented herein.

Based on the first example, a unified definition for rank 3-8 on boosted power may be worked out according to some embodiments. The unified definition may in embodiments herein uniquely associate the transmission power with rank. Given a rank value R, the following formulas may be presented:

In CDM group-1, each layer has boosted power on DM-RS RE by X times, where $$X = R/\text{floor}(R/2). \qquad (1)$$

In CDM group-2, each layer has boosted power on DM-RS RE by Y times, where $$Y = R/\text{ceil}(R/2). \qquad (2)$$

The floor and ceil (ceiling) functions map a real number to the largest previous or the smallest following integer, respectively.

As a second example, when non-constant modulus precoder is used, e.g. in case of open-loop transmission or EBB-based (Eigen-based Beamforming based) non-codebook based precoding in TDD, transmission layers may have different power. Basically, similar power boosting on DM-RS RE may be done.

For rank 3-8, transmission layers are distributed in either CDM group 1 or CDM group 2. In order to average out power difference between reference elements and data elements, it is proposed to roughly double transmit power.

Figure 5C:
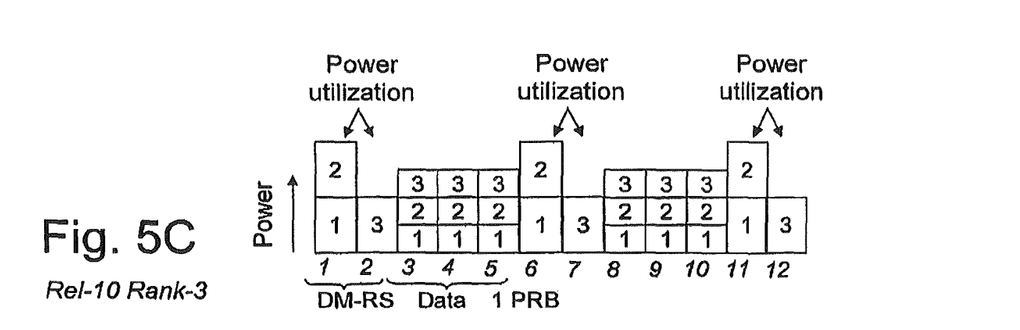
Figure 5D:
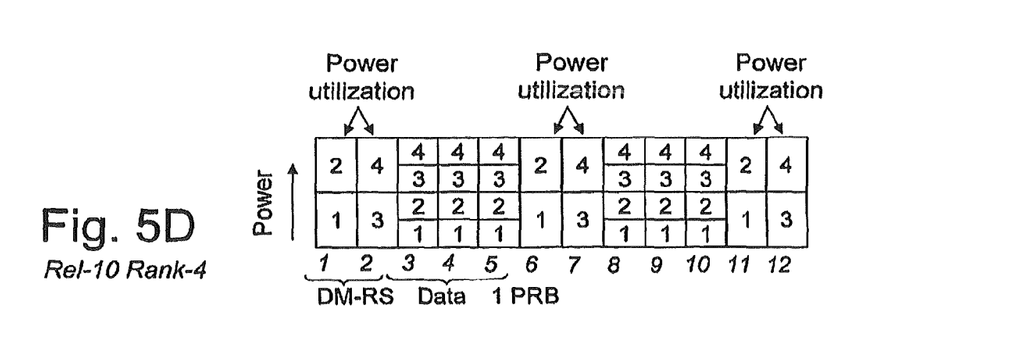

According to the second example, in some embodiments of the method in the radio network node 120, the following may be performed for the adapting of transmission power:

260 The radio network node 120 determines the transmission power of each of the reference elements by adjusting transmission power by a third factor of 2. This is illustrated in FIG. 5C-5D, which show power diagrams for MIMO transmissions for Rank 3 and 4, respectively.

In order to be able to handle different scenarios, such as transmissions of various numbers of layers, it is proposed to pre-define a set for each CDM group or both CDM groups, e.g. $Z=\{1, 2\}$. This means that each layer in each CDM group or both CDM group has boosted power on DM-RS RE by Z times, where Z assumes the value of 1 or 2 as is appropriate in view of the transmission rank.

In some embodiments of the method in the radio network node 120, the following may be performed:

270 The radio network node 120 sends, to the user equipment 110, a message for specifying the adapted transmission power.

In some embodiments of the method in the radio network node 120, the message comprises information about value of the first, second and/or third factors. For example, the message may specify a value of Z, which is to be applied to the reference elements. Expressed differently, higher layer configuration messages may indicate to UE 110 which value of Z is used.

In some embodiments, it may be that different kinds of precoder are supported, including constant modulus precoder and non-constant modulus precoder. Therefore, in order to improve robustness, some embodiments use higher layer configuration to indicate to the user equipment different schemes used for power allocation. In this manner, the user equipment 110 may understand, i.e. receive information about, what power allocation scheme is applied at radio network node 120, such as the eNB side in any of the embodiments described above.

Figure 6:
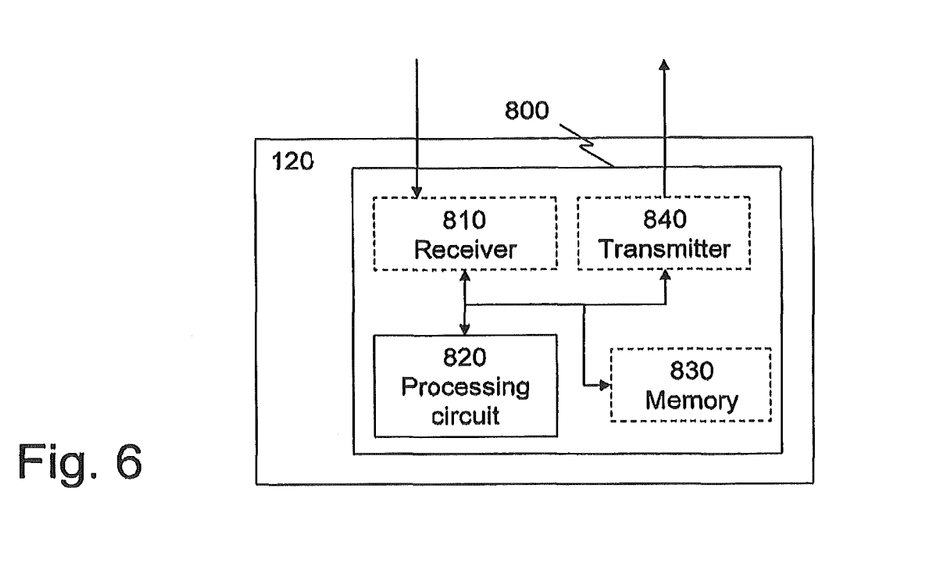
FIG. 6 shows a schematic, exemplifying block diagram of the arrangement in the radio base station.

Now referring to FIG. 6, there is shown a schematic, exemplifying block diagram of an arrangement 800 in a radio network node 120 for adapting transmission power of resource elements for demodulation reference signals, referred to as "reference elements". The radio network node 120 may comprise the arrangement 800. The radio network node 120 is configured for multiple-input multiple-output transmission, referred to as "MIMO transmission", to a user equipment 110. Said MIMO transmission comprises at least three layers, each layer being allocated to a resource block of said MIMO transmission. The resource block comprises subcarriers. Two consecutive subcarriers of the resource block carry at least three reference elements for said at least three layers. A first subcarrier of the resource block carries data elements for said at least three layers. The first subcarrier is different from said two consecutive subcarriers. The arrangement 800 may comprise a processing circuit 820 configured to adapt transmission power of said at least three reference elements such that an average transmission power, over said two consecutive subcarriers, of said at least three reference elements is equal to a transmission power, for the first subcarrier, of the data elements for said at least three layers. Moreover, the processing circuit 820 may further be configured to use the adapted transmission power to transmit, to the user equipment 110, said at least three reference elements. The processing circuit 820 may be a processing unit, a processor, an application specific integrated circuit (ASIC), a field-programmable gate array (FPGA) or the like.

Moreover, in some embodiments, the arrangement 800 may comprise a memory 830, as indicated by dashed lines, for storing software to be executed by, for example, the processing circuit 820. The software may comprise instructions to enable the processor to perform the method in the radio network node 120 described above.

In some embodiments, the arrangement 800 may further comprise a transmitter 840 and a receiver 810 as indicated by dashed lines.

In some embodiments of the arrangement 800 in the radio network node 120, the processing unit 820 may further be configured to determine transmission power of each reference element of said at least three reference elements based on a number of layers of the MIMO-transmission. The number of layers is at least three.

In some embodiments of the arrangement 800 in the radio network node 120, a first set of reference elements comprises a first at least one reference element of said at least three reference elements. Said first at least one reference element is allocated to a first subcarrier of said two consecutive subcarriers. A second set of reference elements comprises a second at least one reference element of said at least three reference elements. Said second at least one reference element is allocated to a second subcarrier of said two consecutive subcarriers.

In some embodiments of the arrangement 800 in the radio network node 120, the first set of reference elements is comprised in a first code division multiplexing group and the second set of reference elements is comprised in a second code division multiplexing group.

In some embodiments of the arrangement 800 in the radio network node 120, the processing unit 820 may further be configured to determine a first transmission power of each reference element of the first set of the reference elements by adjusting transmission power by a first factor of R/floor(R/2). Additionally or alternatively, the processing unit 820 may further be configured to determine a second transmission power of each reference element of the second set of the reference elements by adjusting transmission power by a second factor of R/ceil(R/2) times. R is a transmission rank of said MIMO transmission.

In some embodiments of the arrangement 800 in the radio network node 120, the processing unit 820 may further be configured to determine the transmission power of each of the reference elements by adjusting transmission power by a third factor of 2, In some embodiments of the arrangement 800 in the radio network node 120, the transmitter 840 may be configured to send, to the user equipment 110, a message for specifying the adapted transmission power.

In some embodiments of the arrangement 800 in the radio network node 120, the message may comprise information about value of the first, second and/or third factors.

It is herein proposed to use DM-RS power boosting for UE specific reference signals, DM-RS, in LTE-Advanced, such as LTE Rel-10. In some embodiments, this is achieved without explicit dynamic control signaling indication, while at the same time improve transmit power utilization for the reference elements. It may further be noted that the increased power of the reference elements is not borrowed or coming from data RE, but rather an effect of an improved power utilization scheme. Moreover, L1 control signaling overhead is not increased, since explicit dynamic control signaling indication is not needed because the UE may know which scheme is used by observing the rank of the MIMO transmission.

In some embodiments disclosed herein, a unified power boosting scheme is used. The unified power boosting scheme determines power offset between data RE and DM-RS RE as a function of the number of layers, or equivalently for the transmission rank, or equivalently the number of antenna ports used.

In short, the power offset between the data resource elements and the reference signal resource elements (DM-RS RE) is determined, in some embodiments, as a function of the number of layers, or equivalently for the transmission rank, or equivalently the number of antenna ports used.

In the description above, for purposes of explanation and not limitation, specific details are set forth, such as particular techniques and applications in order to provide a thorough understanding of the embodiments disclosed herein. In other instances, detailed descriptions of well-known methods and apparatuses are omitted so as not to obscure the description of embodiments with unnecessary details.

It will be obvious that embodiments may be varied in a plurality of ways. Such variations are not to be regarded as a departure from the scope of the present disclosure. All such modifications as would be obvious to one skilled in the art are intended to be included within the scope of the appended claims.

In one embodiment, there is provided a method for adapting transmission power for reference signals in a multiple-input multiple-output telecommunication system, characterized in adapting transmission power of resource elements carrying reference signaling to be substantially equal to the transmission power used for resource elements carrying data.

In one embodiment, at least two code division multiplexing groups are used for transmission.

In one embodiment, each code division multiplexing group comprises four layers.

In one embodiment, there is provided a first and a second code division multiplexing group, each comprising four layers, constituting a rank 8 transmission scheme, is used.

In one embodiment, the power of said first code division multiplexing group is boosted R/(Floor(R/2)) times, and the power of said second code division multiplexing group is boosted R/(Ceil(R/2)) times, where R is the rank, or number of layers used, for the transmission.

In one embodiment, the power for resource elements carrying reference signaling for rank 1 and 2 transmissions is not boosted, and the power for resource elements carrying reference signaling for rank 3 to 8 is doubled.

In one embodiment, the method comprises defining a set of values defining the power boost to be used for each code division multiplexing group.

In one embodiment, the method comprises sending a message to a user equipment indicating which value or values are used for power boosting of resource elements carrying reference signaling.

In one embodiment, the method comprises sending a message to a user equipment indicating a resource element power boosting scheme to be used by a radio base station for boosting the transmission power of resource elements carrying reference signaling.

In one embodiment, there is provided a radio base station configured to perform the method according to any embodiment presented herein.

In one embodiment, there is provided a user equipment, comprising a receiver module, configured to adapt said receiver module in dependence of an indication of resource element power boosting according to any embodiment disclosed herein for boosting the transmission power of resource elements carrying reference signaling.

In one embodiment, said indication is selected from a group of indications comprising: the use of rank transmission scheme of higher order than 2, a message received from a radio base station indicating resource element power boosting values, a message received from a radio base station indicating a resource element power boosting scheme.

The invention claimed is:

1. A method in a radio network node for adapting transmission power of reference elements which comprise resource elements for demodulation reference signals, wherein the radio network node is configured for multiple-input multiple-output (MIMO) transmission to a user equipment, wherein said MIMO transmission comprises at least three layers, each layer being allocated to a resource block of said MIMO transmission, wherein the resource block comprises subcarriers, wherein two consecutive subcarriers of the resource block carry a number of reference elements equal to a number of said at least three layers, wherein a first subcarrier of the resource block carries data elements for said at least three layers, the first subcarrier being different from said two consecutive subcarriers, wherein the method comprises:
adapting transmission power of said number of reference elements such that an average transmission power, over said two consecutive subcarriers, of said number of reference elements is equal to a transmission power, for the first subcarrier, of the data elements for said at least three layers, and
using the adapted transmission power to transmit, to the user equipment, said number of reference elements,
wherein the adapting transmission power comprises determining transmission power of each reference element of said number of reference elements based on a number of layers of the MIMO transmission, wherein the number of layers is at least three.

2. The method according to claim 1, wherein:
a first set of reference elements comprises a first at least one reference element of said number of reference elements;
said first at least one reference element is allocated to a first subcarrier of said two consecutive subcarriers, and a second set of reference elements comprises a second at least one reference element of said number of reference elements; and
said second at least one reference element is allocated to a second subcarrier of said two consecutive subcarriers.

3. The method according to claim 2, wherein the first set of reference elements is comprised in a first code division multiplexing group and the second set of reference elements is comprised in a second code division multiplexing group.

4. The method according to claim 2, wherein the determining further comprises:
 determining a first transmission power of each reference element of the first set of the reference elements by adjusting transmission power by a first factor of R/(Floor (R/2)); and/or
 determining a second transmission power of each reference element of the second set of the reference elements by adjusting transmission power by a second factor of R/(Ceil(R/2)), where R is a transmission rank of said MIMO transmission.

5. The method according to claim 4, further comprising:
 sending, to the user equipment, a message for specifying the adapted transmission power,
 wherein the message comprises information about value of the first and/or second factors.

6. An arrangement in a radio network node for adapting transmission power of reference elements which comprise resource elements for demodulation reference signals, wherein the radio network node is configured for multiple-input multiple-output (MIMO) transmission to a user equipment, wherein said MIMO transmission comprises at least three layers, each layer being allocated to a resource block of said MIMO transmission, wherein the resource block comprises subcarriers, wherein two consecutive subcarriers of the resource block carry a number of reference elements equal to a number of said at least three layers, wherein a first subcarrier of the resource block carries data elements for said at least three layers, the first subcarrier being different from said two consecutive subcarriers, wherein the arrangement comprises:
 a processing circuit configured to:
  adapt transmission power of said number of reference elements such that an average transmission power, over said two consecutive subcarriers, of said number of reference elements is equal to a transmission power, for the first subcarrier, of the data elements for said at least three layers, the processing circuit further being configured to use the adapted transmission power to transmit, to the user equipment, said number of reference elements, and
  determine transmission power of each reference element of said number of reference elements based on a number of layers of the MIMO transmission, wherein the number of layers is at least three.

7. The arrangement in the radio network node according to claim 6, wherein a first set of reference elements comprises a first at least one reference element of said number of reference elements, wherein said first at least one reference element is allocated to a first subcarrier of said two consecutive subcarriers, and a second set of reference elements comprises a second at least one reference element of said number of reference elements, wherein said second at least one reference element is allocated to a second subcarrier of said two consecutive subcarriers.

8. The arrangement in the radio network node according to claim 7, wherein the first set of reference elements is comprised in a first code division multiplexing group and the second set of reference elements is comprised in a second code division multiplexing group.

9. The arrangement in the radio network node according to claim 7, wherein the processing circuit further is configured to:
 determine further a first transmission power of each reference element of the first set of the reference elements by adjusting transmission power by a first factor of R/(Floor (R/2)); and/or
 to determine a second transmission power of each reference element of the second set of the reference elements by adjusting transmission power by a second factor of R/(Ceil(R/2)), where R is a transmission rank of said MIMO transmission.

10. The arrangement in the radio network node according claim 9, further comprising:
 a transmitter configured to send, to the user equipment, a message for specifying the adapted transmission power,
 wherein the message comprises information about value of the first and/or second factors.

\* \* \* \* \*

UNITED STATES PATENT AND TRADEMARK OFFICE
CERTIFICATE OF CORRECTION

Page 1 of 1

PATENT NO.       : 8,948,769 B2
APPLICATION NO.  : 14/053901
DATED            : February 3, 2015
INVENTOR(S)      : Hu et al.

It is certified that error appears in the above-identified patent and that said Letters Patent is hereby corrected as shown below:

In the Drawings

In Fig. 4, Sheet 3 of 5, in step "250", in Line 1, delete "power the" and insert -- power of the --, therefor.

In the Specification

In Column 1, Line 9, delete "2010" and insert -- 2010, now Pat. No. 8,649,793, --, therefor.

In Column 1, Line 34, delete "Terrestrial Access" and insert -- Terrestrial Radio Access --, therefor.

In Column 8, Line 67, delete "of 2," and insert -- of 2. --, therefor.

In Column 9, Line 29, delete "the reference" and insert -- the demodulation reference --, therefor.

In the Claims

In Column 12, Line 23, in Claim 9, delete "further is" and insert -- is further --, therefor.

In Column 12, Line 34, in Claim 10, delete "according" and insert -- according to --, therefor.

Signed and Sealed this
Seventh Day of July, 2015

Michelle K. Lee
*Director of the United States Patent and Trademark Office*